US008061590B2

(12) United States Patent
Day et al.

(10) Patent No.: US 8,061,590 B2
(45) Date of Patent: Nov. 22, 2011

(54) PRIVACY-ENABLED KEYPAD

(75) Inventors: Philip N. Day, Fife (GB); Lynne M. Coventry, Edinburgh (GB)

(73) Assignee: NCR Corporation, Duluth, GA (US)

( * ) Notice: Subject to any disclaimer, the term of this patent is extended or adjusted under 35 U.S.C. 154(b) by 682 days.

(21) Appl. No.: 11/981,306

(22) Filed: Oct. 31, 2007

(65) Prior Publication Data

US 2009/0107815 A1 Apr. 30, 2009

(51) Int. Cl.
*G06F 19/00* (2006.01)

(52) U.S. Cl. ........................................................ 235/379

(58) Field of Classification Search .................. 235/379; 341/20

See application file for complete search history.

(56) References Cited

U.S. PATENT DOCUMENTS

| | | | | |
|---|---|---|---|---|
| 5,353,349 | A * | 10/1994 | Brown | 379/450 |
| 5,748,728 | A * | 5/1998 | Ginsberg et al. | 379/447 |
| 6,966,485 | B2 * | 11/2005 | Lute et al. | 235/379 |
| 7,091,429 | B2 * | 8/2006 | Case et al. | 200/5 A |
| 7,334,442 | B2 * | 2/2008 | Case et al. | 70/278.1 |
| 2005/0134484 | A1 * | 6/2005 | Case et al. | 341/20 |
| 2006/0037373 | A1 * | 2/2006 | Case et al. | 70/278.1 |
| 2006/0226215 | A1 * | 10/2006 | Yu et al. | 235/379 |
| 2010/0172033 | A1 * | 7/2010 | Radford | 359/743 |

FOREIGN PATENT DOCUMENTS

WO WO 2006120479 A2 * 11/2006

* cited by examiner

*Primary Examiner* — Daniel Hess

(74) *Attorney, Agent, or Firm* — Peter Priest; Michael Chan

(57) ABSTRACT

A privacy-enabled keypad comprising: a keypad; an opaque shield upstanding around the keypad for restricting viewing of the keypad to a user of the keypad; and at least one illumination source disposed on a portion of the shield facing the keypad, and oriented to illuminate the keypad. A public access terminal incorporating the privacy-enabled keypad is also disclosed.

19 Claims, 3 Drawing Sheets

FIG. 2
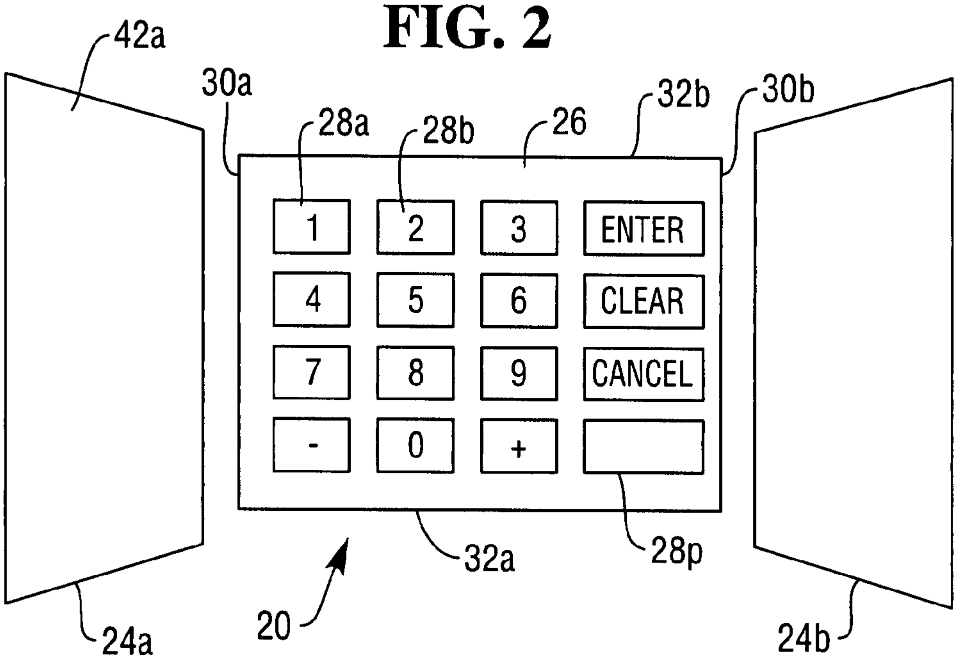
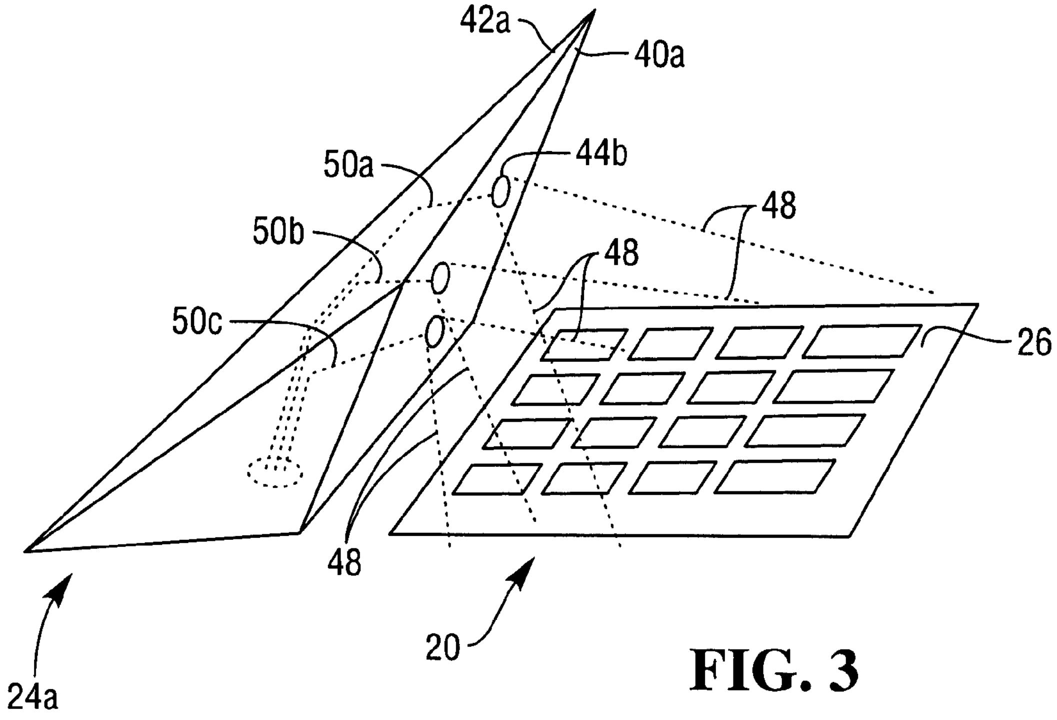
FIG. 3

FIG. 4
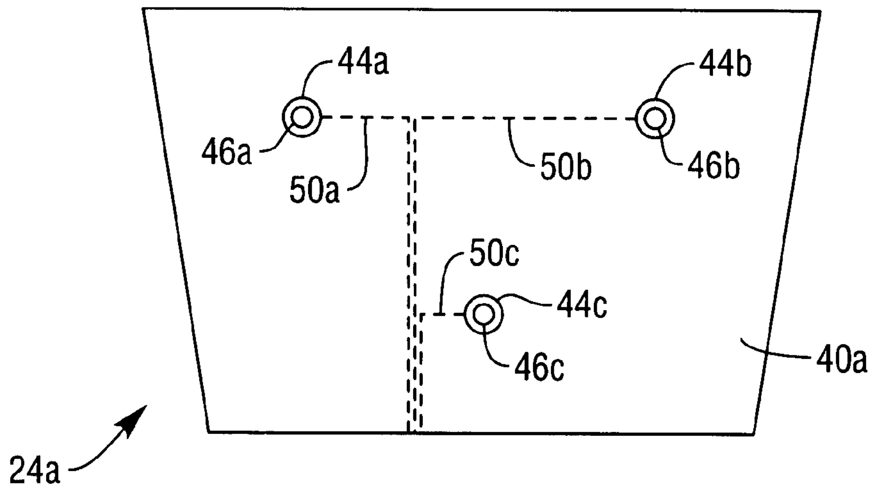
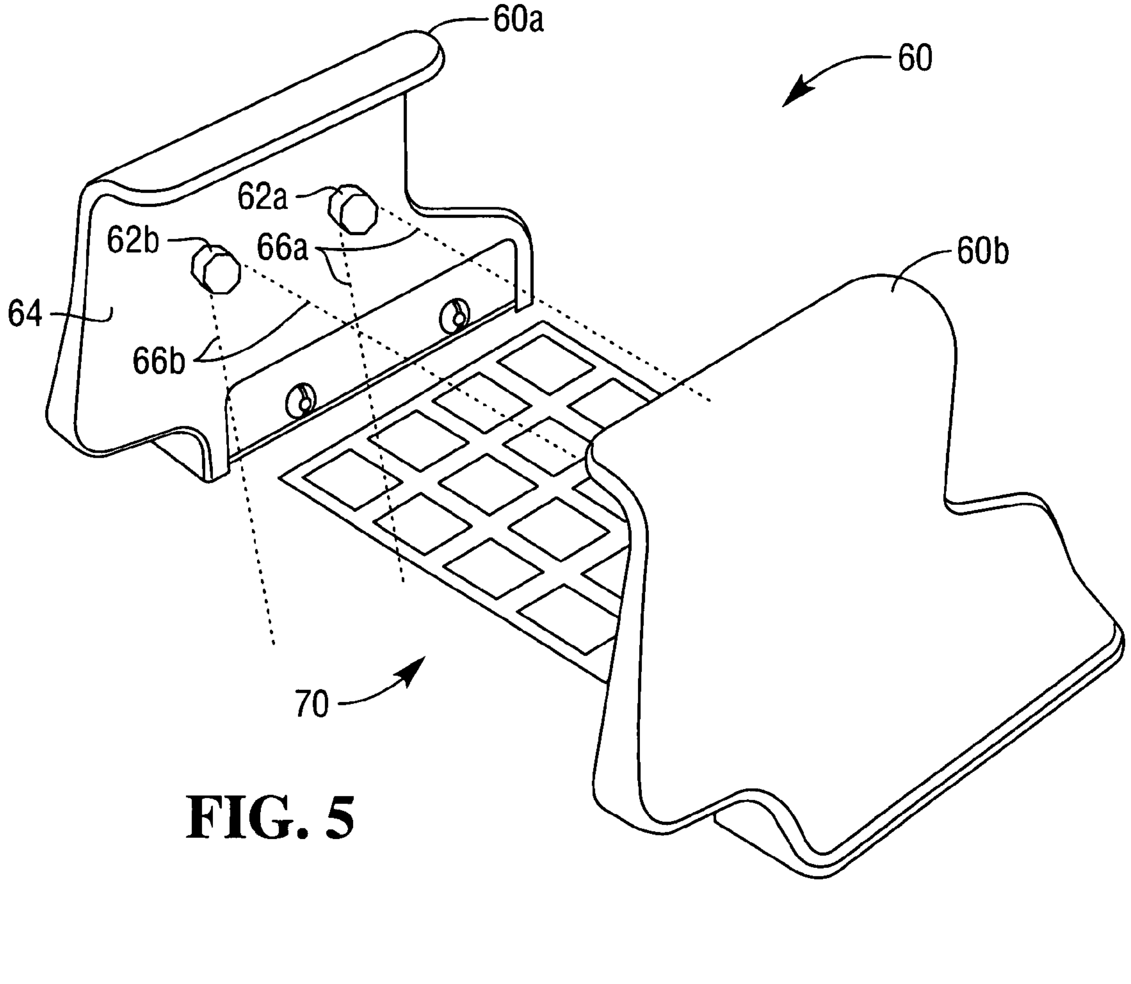
FIG. 5

PRIVACY-ENABLED KEYPAD

BACKGROUND

The present invention relates to improvements in or relating to privacy-enabled keypads.

Privacy-enabled keypads are used on public access terminals, such as automated teller machines (ATMs) and point of sale (PoS) terminals.

Such public access terminals typically require a user to enter a secret code, such as a personal identification number (PIN), on a publicly viewable keypad. Increasing instances of fraud at ATMs, such as shoulder-surfing to observe someone else's PIN, has led to use of privacy-enabled keypads. These privacy-enabled keypads typically employ upstanding, opaque shields that at least partially obscure the keypad, thereby making it more difficult for passers-by and fraudsters to observe the user's PIN while the user is depressing the relevant keys on the keypad.

Current and proposed privacy standards (such as ZKA in Germany) suggest that keypads on public access terminals should have a limited cone of viewability to increase privacy and security for the user. This has led to keypads having shields at least partially surrounding the keypads to restrict the viewing angle.

However, accessibility standards and legislation require that keypads can be easily used by people with a visual disability. By using shields around a keypad ambient light is reduced, so visually-impaired people have more difficulty in viewing and using the keypad. There is therefore a conflict in the requirements of the two sets of standards.

Some ATMs include lighting on a fascia of the ATM to illuminate the keypad; however, this does not work effectively for users with visual impairments because such users typically have to move their eyes very close to the keypad surface, thereby blocking out the fascia lighting with their head.

SUMMARY

According to a first aspect of the present invention there is provided a privacy-enabled keypad comprising: a keypad; an opaque shield upstanding around the keypad for restricting viewing of the keypad to a user of the keypad; and at least one illumination source disposed on a portion of the shield facing the keypad, and oriented to illuminate the keypad.

The keypad may have an upper surface defining a plurality of keys generally aligned within a plane, and the shield may be upstanding relative to this plane. The opaque shield preferably only partially surrounds the keypad or otherwise allows easy access for a customer's hand. The keypad may be an encrypting keypad.

The opaque shield may have any convenient shape or profile for improved privacy and/or aesthetics.

The opaque shield may comprise a plurality of shield components or one continuous shield. Where a plurality of shield components are used, two complementary components may be used, such that the two components are disposed on opposing sides of an upper surface of the keypad.

The opaque shield may include one or more additional illumination sources disposed on a portion of the shield facing away from the keypad, and oriented to illuminate an area outside the opaque shield.

In some embodiments, a plurality of illumination sources may be provided on the portion of the shield facing the keypad. For example, where a plurality of shield components are used, each shield component may include an illumination source or multiple illumination sources, on the portion of the shield facing the keypad.

The illumination source (or sources) may be configured to illuminate the keypad with at least 200 lux of light.

The opaque shield may be configured to restrict the viewing angle to a cone of approximately ninety degrees or less.

The illumination source (or sources) may be located within the opaque shield. For example, the opaque shield may have a transparent inner surface inside which is mounted the at least one illumination source, or apertures in which the at least one illumination source are mounted. Alternatively, or additionally, the at least one illumination source may be mounted on an exterior of an inner surface of the opaque shield.

The opaque shield may operate as a light pipe so that the shield acts as an illumination source by propagating light from an LED (or other illumination source) to the keypad.

The at least one illumination source may be powered in any convenient manner, for example, by a battery, from a power supply in a public access terminal to which the keypad is coupled, from a solar cell, from a power supply within the keypad itself, or from any other convenient source. Power may be supplied to the at least one illumination source via wires routed through a channel in the opaque shield. Where the opaque shield is removably coupled to the public terminal, the shield may include conducting terminals for mutual engagement with corresponding conducting terminals on the public terminal.

In a preferred embodiment, the illumination source is located within fifteen centimeters (15 cm) of a surface of the keypad. In another embodiment, the illumination source is located within five centimeters (5 cm) of a surface of the keypad.

The illumination source may be disposed at a lower height than an upper surface of the opaque shield.

According to a second aspect of the present invention there is provided a public access terminal comprising: a keypad; an opaque shield disposed around the keypad for restricting viewing of the keypad to a customer of the public access terminal; and at least one illumination source disposed on a portion of the opaque shield facing the keypad, and oriented to illuminate the keypad.

The keypad may be located in a customer interface portion of the public access terminal. The customer interface portion may comprise a molded fascia. The fascia may be profiled to define the opaque shield; that is, the opaque shield may be molded as part of the fascia. Alternatively, the opaque shield may be removably coupled to the fascia. The opaque shield may include, or be coupled to, one or more frangible portions to minimize damage to the fascia in the event of vandalism of the opaque shield. The opaque shield may be coupled by terminal fixings that are frangible, so that the opaque shield breaks cleanly from the public access terminal in the event of attempted vandalism. Alternatively or additionally, the opaque shield may comprise one or more flexible portions so that the opaque shield deflects when struck (for example by a vandal), but returns to a normal position when the deflecting force is removed.

The public access terminal may be an ATM, a kiosk, a check-in or check-out terminal, a point of sale terminal, a peripheral for use with a point of sale terminal (such as a PIN entry terminal for use with a credit card or debit card reader), a financial services center, a postal services center, or the like.

By virtue of this aspect of the invention, a user can place his/her head in close proximity to the keypad and not block out the light from the illumination source. These embodiments have the advantage of improving both accessibility and privacy.

BRIEF DESCRIPTION OF THE DRAWINGS

These and other aspects of the present invention will be apparent from the following specific description, given by way of example, with reference to the accompanying drawings, in which:

FIG. 2 is a plan view of part of the ATM of FIG. 1, showing a keypad and opaque shield in more detail;

FIG. 3 is a perspective view of part of the shield of FIG. 2, showing internal features in more detail;

FIG. 4 is a side view of the part of the shield of FIG. 3, showing illumination sources in more detail; and FIG. 5 is a perspective view of an alternative design of opaque shield.

DETAILED DESCRIPTION

Figure 1:
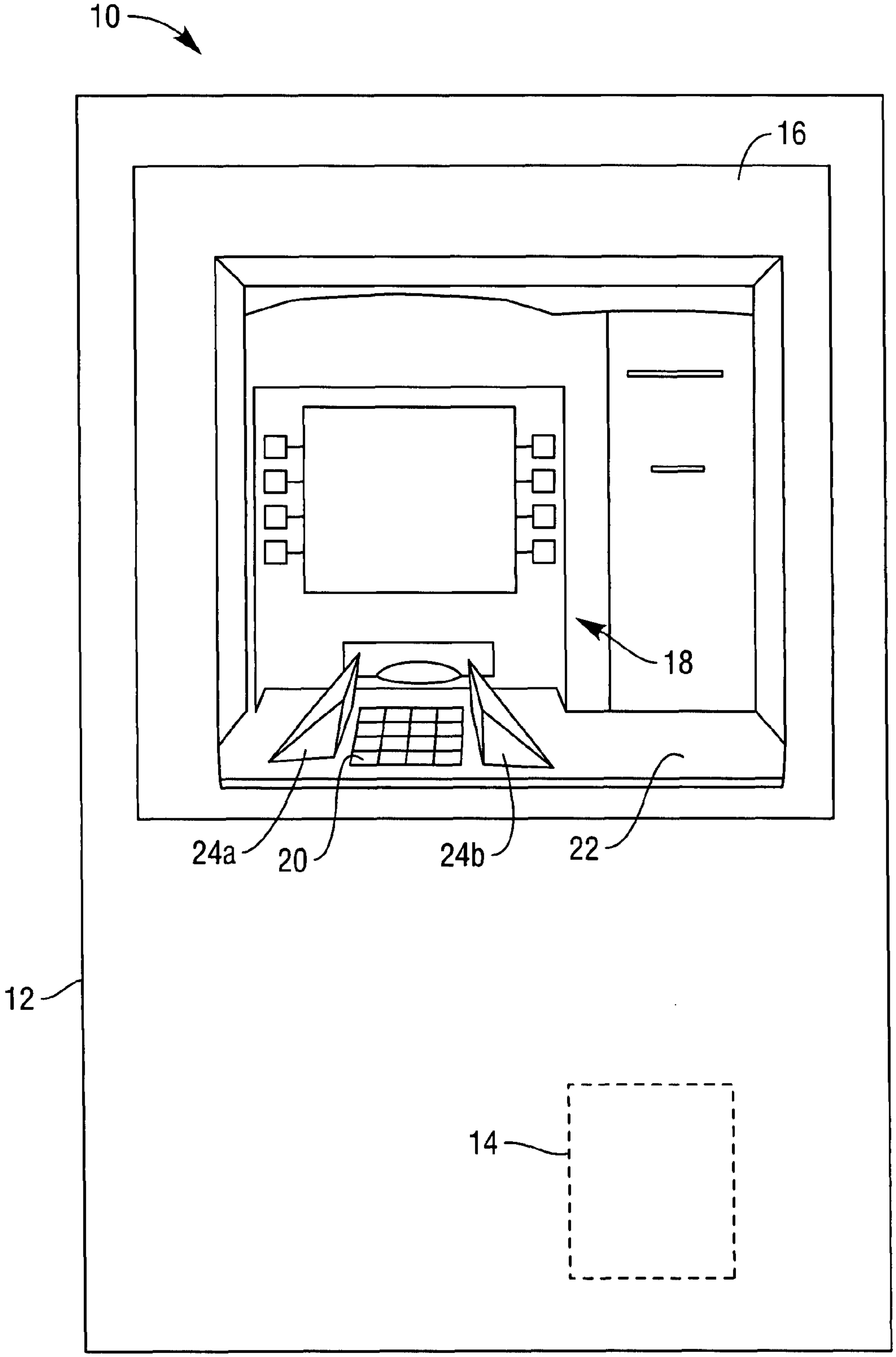
FIG. 1 is a front view of a public access terminal (in the form of an ATM) in accordance with one embodiment of the present invention.

Reference is first made to FIG. 1, which shows a public access terminal 10 in the form of a through-the-wall ATM. The ATM 10 includes a chassis 12 in which devices are mounted, including a power supply 14, and a fascia 16 providing a customer interface 18.

The customer interface 18 includes a keypad 20 protruding through an aperture in the fascia 16, in this embodiment the aperture is in a shelf 22 defined by the fascia 16, as well as other components typically provided in an ATM customer interface. The fascia 16 is molded to provide an opaque shield 24 having two components 24*a,b* (referred to as wings) to restrict visibility of the entire keypad 20 to a person located directly in front of the keypad 20.

Reference is also made to FIG. 2, which illustrates the keypad 20 and opaque shield 24 in more detail. The keypad 20 is generally rectangular, when viewed from above, and has an upper surface 26 on which sixteen keytips 28*a* to 28*p* are disposed for depression by a customer. The keypad 20 has opposing lateral sides 30*a,b* and opposing long sides 32*a,b*.

The wings 24*a,b* are upstanding from the shelf 22, have complementary formations, and are disposed adjacent the opposing lateral sides 30*a,b* of the keypad 20.

One of the wings 24*a* will now be described in more detail with reference to FIG. 3, which is a perspective view of the wing 24*a*, and FIG. 4, which is a side view of wing 24*a*. The other wing 24*b* is a mirror image of, but otherwise identical to, the first wing 24*a*.

Wing 24*a* has an inner surface 40*a* facing the keypad 20 and an outer surface 42*a* facing away from the keypad 20. The inner surface 40*a* defines three apertures 44 (labeled a through c in FIG. 4) through which three illumination sources 46 (labeled a through c in FIG. 4) irradiate the keypad surface 26. In this embodiment, the illumination sources 46 are white light LEDs. The LEDs 46 are oriented to direct light towards the keypad surface 26, and are selected to ensure that the keypad surface 26 is illuminated with at least 200 lux, as illustrated by broken lines 48 in FIG. 3. The wing 24*a* is hollow to provide a channel that allows power lines 50 (labeled a through c in FIGS. 3 and 4) to be routed from the power supply 14 (FIG. 1) in the ATM 10 to the illumination sources 46.

During operation, when a customer desires to enter his/her PIN, the illumination sources 46 provide ample light to allow the customer to see the keypad surface 26, even if the customer places his/her head in contact with the wings 24*a,b*. This has the advantage of increasing usability without compromising privacy.

Reference is now made to FIG. 5, which is a perspective view of an alternative design of opaque shield 60. The shield 60 has two complementary components, wing 60*a* and wing 60*b*, which are a mirror image of each other. Wing 60*a* has two illumination sources 62*a*,62*b* (in the form of LEDs) disposed on an inner surface 64. The LEDs 62 are positioned to irradiate a keypad 70, as illustrated by broken lines 66*a* and 66*b*.

Various modifications may be made to the above described embodiment within the scope of the invention, for example, a different number of illumination sources may be used. More or fewer than two shield components may be used. Any convenient profile may be used for the opaque shield.

In other embodiments different illumination sources may be used, for example, luminescent panels. In other embodiments, different power sources may be used, such as a solar panel or a battery.

In other embodiments, the illumination sources may only be activated on insertion of a card or on detection of a user to minimize power use.

In other embodiments, the keypad may have a different configuration to that shown; for example, the keypad may be an alphanumeric keypad rather than a numeric keypad. The keypad may be disposed on a different terminal, such as a PoS terminal, a card reading terminal, or the like.

In some embodiments the wings may be retrofitted to the shelf, and may include frangible portions and/or frangible fixings so that the shelf is not damaged if the wings are vandalized. The opaque shield may include flexible portions, resiliently biased to a normal operating position.

What is claimed is:

1. A public access terminal comprising:

a fascia having a keypad aperture;

a keypad protruding through the keypad aperture;

an opaque shield upstanding around the keypad for restricting viewing of the keypad to a user of the keypad;

a frangible portion coupled to the opaque shield to allow the opaque shield to be removably coupled to the fascia and thereby to allow the opaque shield to cleanly break away from the fascia so as to minimize damage to the fascia in the event the opaque shield is vandalized; and at least one powerable illumination source disposed on a portion of the opaque shield facing the keypad and for, when powered, illuminates the keypad.

2. A public access terminal according to claim 1, wherein the opaque shield only partially surrounds the keypad.

3. A public access terminal according to claim 1, wherein the opaque shield comprises a plurality of shield components.

4. A public access terminal according to claim 1, wherein the at least one powerable illumination source, when powered, illuminates the keypad with at least 200 lux of light.

5. A public access terminal according to claim 1, wherein the opaque shield restricts the viewing angle to a cone of approximately ninety degrees or less.

6. A public access terminal according to claim 1, wherein the terminal is an automated teller machine.

7. A public access terminal according to claim 1, wherein the terminal is a point of sale terminal.

8. A public access terminal according to claim 1, further comprising:

a solar cell which provides power to the at least one powerable illumination source.

9. A public access terminal comprising:

a keypad;

an opaque shield disposed around the keypad for restricting viewing of the keypad to a customer of the public access terminal, wherein (i) the opaque shield includes an inner surface facing the keypad and an outer surface facing away from the keypad, and (ii) the inner surface has at least one aperture defined therein;

at least one powerable illumination source positioned relative to the inner and outer surfaces and positioned relative to the at least one aperture such that light from the illumination source, when powered, is directed through the at least one aperture to illuminate the keypad; and a solar cell which provides power to the at least one powerable illumination source.

10. A public access terminal according to claim 9, wherein the terminal is an automated teller machine.

11. A public access terminal according to claim 9, wherein the terminal is a point of sale terminal.

12. A public access terminal according to claim 9, wherein the opaque shield only partially surrounds the keypad.

13. A public access terminal according to claim 9, wherein the at least one powerable illumination source, when powered, illuminates the keypad with at least 200 lux of light.

14. A public access terminal comprising:

a fascia having a keypad aperture;

a keypad protruding through the keypad aperture of the fascia;

an opaque shield disposed around the keypad for restricting viewing of the keypad to a customer of the public access terminal, wherein (i) the opaque shield includes an inner surface facing the keypad and an outer surface facing away from the keypad, and (ii) the inner surface has at least one aperture defined therein;

a frangible portion coupled to the opaque shield to allow the opaque shield to be removably coupled to the fascia and thereby to allow the opaque shield to cleanly break away from the fascia so as to minimize damage to the fascia in the event the opaque shield is vandalized; and at least one powerable illumination source positioned relative to the inner and outer surfaces and positioned relative to the at least one aperture such that light from the illumination source, when powered, is directed through the at least one aperture to illuminate the keypad.

15. A public access terminal according to claim 14, wherein the opaque shield only partially surrounds the keypad.

16. A public access terminal according to claim 14, wherein the at least one powerable illumination source, when powered, illuminates the keypad with at least 200 lux of light.

17. A public access terminal according to claim 14, wherein the terminal is an automated teller machine.

18. A public access terminal according to claim 14, wherein the terminal is a point of sale terminal.

19. A public access terminal according to claim 14, further comprising:

a solar cell which provides power to the at least one powerable illumination source.

* * * * *